US011284039B2

(12) United States Patent
Antonellis et al.

(10) Patent No.: US 11,284,039 B2
(45) Date of Patent: Mar. 22, 2022

(54) MOTION PICTURE DISTRIBUTION SYSTEM AND RELATED METHOD

(75) Inventors: Darcy Antonellis, Granada Hills, CA (US); Ken Long, Burbank, CA (US)

(73) Assignee: WARNER BROS. ENTERTAINMENT INC., Burbank, CA (US)

(*) Notice: Subject to any disclaimer, the term of this patent is extended or adjusted under 35 U.S.C. 154(b) by 2108 days.

(21) Appl. No.: 12/413,018

(22) Filed: Mar. 27, 2009

(65) Prior Publication Data
US 2009/0185684 A1 Jul. 23, 2009

Related U.S. Application Data

(62) Division of application No. 11/102,552, filed on Apr. 8, 2005, now abandoned.
(Continued)

(51) Int. Cl.
*H04L 9/32* (2006.01)
*H04N 7/167* (2011.01)
(Continued)

(52) U.S. Cl.
CPC ........... *H04N 7/1675* (2013.01); *H04N 7/163* (2013.01); *H04N 7/17318* (2013.01);
(Continued)

(58) Field of Classification Search
CPC ........ G06F 30/00; G06F 17/00; H04M 7/173; H04M 11/00; H04N 7/10; H04N 7/1675;
(Continued)

(56) References Cited

U.S. PATENT DOCUMENTS 5,974,144 A * 10/1999 Brandman ........... H04N 7/1675
348/E7.056
6,069,956 A * 5/2000 Kurihara ................ H04H 20/28
348/E7.056
(Continued)

FOREIGN PATENT DOCUMENTS

WO 9831114 A1 7/1998
WO 0120447 A1 3/2001
(Continued)

OTHER PUBLICATIONS

Japanese Notice of Appeal and Appeal Brief filed Oct. 13, 2011 for JP 2007-507518.
(Continued)

*Primary Examiner* — Patrick McAtee
*Assistant Examiner* — Nakia Leffall-Allen
(74) *Attorney, Agent, or Firm* — One LLP (57) ABSTRACT

A motion picture distribution system, the system including a central computer, an exhibitor computer, a communication channel, and a back channel. The central computer is located at a central site and configured to distribute a digital version of the motion picture. The exhibitor computer is located at an exhibitor location that is remote from the central site. The exhibitor computer is configured both to receive the digital version of the motion picture from the central computer, and to display the motion picture. The communication channel is configured to facilitate the electronic transfer of the digital version of the motion picture from the central computer to the exhibitor computer. The back channel is coupled between the central computer and the exhibitor computer, and configured to allow for the transfer of information between the exhibitor computer and the central computer.

19 Claims, 5 Drawing Sheets

Related U.S. Application Data (60) Provisional application No. 60/560,990, filed on Apr. 9, 2004.

(51) Int. Cl.

| | |
|---|---|
| *H04N 21/4385* | (2011.01) |
| *H04N 21/41* | (2011.01) |
| *H04N 21/61* | (2011.01) |
| *H04N 21/258* | (2011.01) |
| *H04N 21/214* | (2011.01) |
| *H04N 21/418* | (2011.01) |
| *H04N 21/6334* | (2011.01) |
| *H04N 7/173* | (2011.01) |
| *H04N 21/4335* | (2011.01) |
| *H04N 21/4405* | (2011.01) |
| *H04N 21/2347* | (2011.01) |
| *H04N 21/414* | (2011.01) |
| *H04N 21/4627* | (2011.01) |
| *H04N 21/4367* | (2011.01) |
| *H04N 21/218* | (2011.01) |
| *H04N 21/4623* | (2011.01) |
| *H04N 21/658* | (2011.01) |
| *H04N 21/231* | (2011.01) |
| *H04N 7/16* | (2011.01) |

(52) U.S. Cl.
CPC ..... *H04N 21/2143* (2013.01); *H04N 21/2182* (2013.01); *H04N 21/2347* (2013.01); *H04N 21/23106* (2013.01); *H04N 21/23473* (2013.01); *H04N 21/25816* (2013.01); *H04N 21/4122* (2013.01); *H04N 21/4181* (2013.01); *H04N 21/41415* (2013.01); *H04N 21/4335* (2013.01); *H04N 21/4367* (2013.01); *H04N 21/43853* (2013.01); *H04N 21/4405* (2013.01); *H04N 21/4623* (2013.01); *H04N 21/4627* (2013.01); *H04N 21/6118* (2013.01); *H04N 21/6125* (2013.01); *H04N 21/6143* (2013.01); *H04N 21/6168* (2013.01); *H04N 21/63345* (2013.01); *H04N 21/6582* (2013.01)

(58) Field of Classification Search
CPC ............... H04N 7/163; H04N 7/17318; H04N 21/2143; H04N 21/2182; H04N 21/23106; H04N 21/2347; H04N 21/23473; H04N 21/25816; H04N 21/4122; H04N 21/41415; H04N 21/4181; H04N 21/4335; H04N 21/4367; H04N 21/43853; H04N 21/4405; H04N 21/4623; H04N 21/4627; H04N 21/6118; H04N 21/6125; H04N 21/6143; H04N 21/6168; H04N 21/63345; H04N 21/6582; H04K 1/00
USPC .................. 709/229, 206; 725/145, 32, 100; 705/27; 380/37; 700/94
See application file for complete search history.

(56) References Cited

U.S. PATENT DOCUMENTS

| | | | | |
|---|---|---|---|---|
| 6,141,530 | A * | 10/2000 | Rabowsky | .................... 725/116 |
| 7,239,709 | B1 * | 7/2007 | Yamada | ........... G11B 20/00086 380/203 |
| 7,305,088 | B2 * | 12/2007 | Kitani | .................... H04N 5/913 348/E7.091 |
| 7,349,921 | B2 * | 3/2008 | Hirstius et al. | |
| 7,711,115 | B2 * | 5/2010 | Candelore | ............ H04N 7/1675 380/227 |
| 8,176,532 | B1 * | 5/2012 | Cook | ..................... H04L 63/10 726/4 |
| 2002/0064283 | A1 * | 5/2002 | Parenty | ................ H04L 9/0825 380/277 |
| 2002/0156912 | A1 * | 10/2002 | Hurst et al. | .................. 709/236 |
| 2003/0002673 | A1 * | 1/2003 | Van Wie | ......... G11B 20/00159 380/232 |
| 2003/0007643 | A1 * | 1/2003 | Ben-Zur | ................ H04N 7/162 380/277 |
| 2003/0198347 | A1 * | 10/2003 | Ribes et al. | .................. 380/277 |
| 2003/0202119 | A1 * | 10/2003 | Masters | ................ H04N 5/253 348/441 |
| 2003/0204851 | A1 * | 10/2003 | Powell | .............. H04N 21/2402 725/63 |
| 2003/0206635 | A1 * | 11/2003 | Morley | ................ H04N 19/146 380/269 |
| 2004/0117852 | A1 | 6/2004 | Karaoguz et al. | |
| 2004/0187159 | A1 * | 9/2004 | Gaydos et al. | ................. 725/92 |
| 2007/0016317 | A1 * | 1/2007 | Kim | ........................ H04N 5/85 700/94 |

FOREIGN PATENT DOCUMENTS

| | | |
|---|---|---|
| WO | WO 03/090045 A2 | 10/2003 |
| WO | 2004051479 A2 | 6/2004 |
| WO | 2006023934 A1 | 3/2006 |

OTHER PUBLICATIONS

Japanese Reply filed Nov. 29, 2012 for JP 2007-507518.
Japanese Arugment filed Jan. 19, 2011 for JP 2007-507518.
Japanese Amendment filed Oct. 13, 2011 for JP 2007-507518.
Japanese Decision of Rejection dated Jun. 14, 2011 for JP 2007-507518.
English Translation for Japanese Decision of Rejection dated Jun. 14, 2011 for JP 2007-507518.
English Translation of Japanese Amended Claims for JP 2007-507518.
English Translation of Japanese Office Action dated Oct. 12, 2010 for JP 2007-507518.
European Communication dated Mar. 9, 2011 for EP 05734873.2.
European Correspondence dated Sep. 13, 2011 for EP 05734873.2.
PCT Written Opinion dated Feb. 20, 2007 for PCT/US2005/029996.
Mort, R., "Cinenet-cinema films and live events via satellite and cablenetworks," Cinenet, May 9, 1997, 1 page.
Clark, J.A., & Bruns, M.W., "Practical Digital Cinema Distribution in an Elvolving Technology Environment," Broadcastpapers.com, Sep. 7, 2001, 10 pages.
Bloom, Jeffrey A., "Security and Rights Management in Digital Cinema," Institute of Electrical and Electronics Engineers, Apr. 6, 2003, 4 pages.
Froemelt, M., "Networks Revolutionize D-Cinema Media Distribution and Exhibition," Broadcastpaprs.com, 2003, 4 pages.
C. Harrison, SMPTE DC28.4: "SMPTE Conditional Access DC 28.4 Working Document", ISO/IEC JTC1/SC29/WG11 MPEG01/M7503, Jul. 2001 (Jul. 2001), XP002341986, Sidney.
Digital Cinema Initiatives, LLC: "Digital Cinema System Specification v.3.01", DCI, Dec. 18, 2003 (Dec. 18, 2003), XP002341989.
EPC Communication pursuant to Article 94(3) dated Oct. 6, 2015 for EP Application No. 05734873.2-1905.
International Search Report dated Sep. 5, 2005 for related PCT Application No. PCT/US2005/011866.
Written Opinion dated Sep. 1, 2005 for related PCT Application No. PCT/US2005/011866.

* cited by examiner

MOTION PICTURE DISTRIBUTION SYSTEM AND RELATED METHOD

CROSS REFERENCE TO RELATED APPLICATIONS

This application is a division of application Ser. No. 11/102,552, filed Apr. 8, 2005, now abandoned, which claims priority under 35 U.S.C. § 119(e) to U.S. Provisional Patent Application No. 60/560,990, filed on Apr. 9, 2004, which applications are incorporated by reference herein.

BACKGROUND OF THE INVENTION

Field of the Invention

The invention relates generally to the field of data distribution. More specifically, the invention relates to the distribution of digital motion picture and associated data required for such distribution.

Description of the Related Art

The advent of the Digital Video Broadcasting ("DVB") standard, which has allowed for a standard protocol for the integration of Internet Protocol ("IP") data into a broadcaster's existing digital satellite bit stream, has made the practical distribution of digital cinema content via satellite possible. The basis for transmitting a digital feature film/motion picture ("digital cinema") via satellite or other terrestrial distribution methods is the same as for transmitting other computer files over multicast IP networks.

Digital cinema content presents a unique challenge. Because the files are very large, it is quite common to find breakpoints in the software used to process those files that go unnoticed with smaller datasets. This can result in overruns and other types of failures when presented with 100+ gigabyte ("GB") datasets. Also, because of the high value of the content, security and adequate electronic means to protect it from unauthorized reception, copying, or exhibition must be thoroughly mitigated. Finally, because even a minor error or break-up of the image during theatrical presentation is unacceptable, methods must be used to ensure the reliable delivery of the content, even given potentially unfavorable conditions at the reception site or the unavailability of a back channel for retransmission requests.

Security of the digital files during their transmission and storage is of great concern. Along with the advances in the bandwidth of home Internet connections, the compression efficiency of modern codecs, the popularity of peer-to-peer file sharing software, and the speed with which a digital version of a film can traverse the Internet, all efforts must be made to protect the files from anything but legitimate exhibition in the designated theatre. The media would be vulnerable to theft not only by someone in the theatre, but by anyone able to intercept the transmission stream or if the transmission is left unencrypted. Thus, the use of a secure encryption technology remains important.

Accordingly, there is need for a motion picture distribution system and related method that provides for the timely and complete transmission of digital cinema files in a secure manner. The present invention satisfies these needs.

SUMMARY OF THE INVENTION

Embodiments of the present invention include a motion picture distribution system and related method that provides for the timely and complete transmission of digital cinema files in a secure manner. The motion picture distribution system includes a central computer, an exhibitor computer, a communication channel, and a back channel. The central computer is located at a central site and configured to distribute a digital version of the motion picture. The exhibitor computer is located at an exhibitor location that is remote from the central site. The exhibitor computer is configured both to receive the digital version of the motion picture from the central computer, and to display the motion picture. The exhibitor computer also is configured to eliminate the risks of reception contention and to provide additional data management of files discreet from play-out systems. The display system can be discreet from the reception system. The reception system can provide reception confirmation and transfer management to display computers included as part of the display system. The communication channel is configured to facilitate the electronic transfer of the digital version of the motion picture from the central computer to the exhibitor computer. The back channel is coupled between the central computer and the exhibitor and/or reception computer. The back channel is configured to allow for the transfer of information between the exhibitor and/or reception computer and the central computer.

In other, more detailed features of the invention, the central computer is configured to receive the motion picture from a remote source, and to generate the digital version of the motion picture based on a compressed, encoded, and encrypted version of the motion picture. Also, the exhibitor computer can be configured to decrypt, decode, and decompress the digital version of the motion picture. In addition, the exhibitor computer can transfer authentication information regarding the exhibitor location to the central computer through the back channel before the motion picture is decrypted by the exhibitor computer. Furthermore, the exhibitor computer can be configured to read and verify a smartcard, and the exhibitor computer can enable decryption of the digital version of the motion picture only after the exhibitor computer verifies the smartcard. Also, the exhibitor computer can be an edge server that is configured to receive, decrypt, decode, and decompress the digital version of the motion picture.

In other, more detailed features of the invention, the system further includes a local server and a display system. The local server is located at the exhibitor location, coupled to the edge server, and configured to store the motion picture before the motion picture is displayed. The display system is located at the exhibitor location, coupled to the local server, and configured to display the motion picture. The edge server transfers the motion picture to the local server, and the local server, in turn, transfers the motion picture to the display system.

In other, more detailed features of the invention, the system further includes a RAID array and a display system. The RAID array is located at the exhibitor location, coupled to the edge server, and configured to store the motion picture before the motion picture is displayed. The display system is located at the exhibitor location, coupled to the RAID array, configured to receive the motion picture from the RAID array, and configured to display the motion picture. The RAID array is configured to provide the necessary file redundancy and accessibility.

In other, more detailed features of the invention, the motion picture distribution system further includes a conditional access system that is embedded within the communication channel and used to authenticate the edge server before the edge server receives the digital version of the motion picture. Also, the communication channel can be a network or a satellite communication channel. In particular, the communication channel can be the Internet, and the central computer can transfer the digital version of the motion picture to the exhibitor location over the Internet using an Internet protocol, a digital video broadcast protocol, or a next generation data transfer protocol.

In other, more detailed features of the invention, the central computer segments the digital version of the motion picture into packets, and electronically transfers the packets to the exhibitor computer on a packet-by-packet basis using a streaming methodology or a store and forward methodology. Also, the central computer can transfer a digital key to the exhibitor computer via the back channel, and the exhibitor computer can use the digital key to facilitate the reassembly of the packets. In addition, the back channel can be established via the Internet, a phone connection, a wireless connection, a dedicated connection, or other next generation communications or distribution channel.

In other, more detailed features of the invention, the central computer is configured to receive information from the exhibitor computer selected from the group consisting of information regarding delivery confirmation of the digital version of the motion picture, format integrity information of the digital version of the motion picture, exhibitor location confirmation information, information regarding movement of the motion picture from the exhibitor computer to a display system that is coupled to the exhibitor computer, the exhibition date of the motion picture, the exhibition time of the motion picture, the exhibition complex at the exhibitor location where the motion picture is displayed, the screening room in the exhibitor complex where the motion picture is displayed, the box office receipts associated with a specific exhibition time of the motion picture, information related to discrepancies with a display system that is coupled to the exhibitor computer, information regarding storage contention issues at the exhibitor location, information regarding the need to retransmit the digital version of the motion picture from the central computer to the exhibitor computer, and confirmation information regarding the deletion of a motion picture stored at the exhibitor location.

In other, more detailed features of the invention, the central computer is configured to prompt the exhibitor computer to purge a motion picture stored at the exhibitor location. Also, the exhibitor computer can be configured to automatically delete a motion picture from the exhibitor location after a predetermined period of time. In addition, the digital version of the motion picture includes visual files, audio files, text and/or subtitle files, special files catering to those with disabilities, and a metadata file; and the metadata file can include an encoded set of key attributes, which are used during decryption of the digital version of the motion picture. Furthermore, the system can use enhanced forward error correction during the electronic transfer of the digital version of the motion picture from the central computer to the exhibitor computer.

Another exemplary embodiment of the invention is a motion picture distribution system, which includes a central computer, an exhibitor computer, an aggregation computer, a first communication channel, a second communication channel and a back channel. The central computer is located at a central site and configured to distribute a digital version of the motion picture. The exhibitor computer is located at an exhibitor location, which is remote from the central site, and configured to receive the digital version of the motion picture from the central site, and to display the motion picture. The aggregation computer is located at an aggregation site, which is remote from both the central site and the exhibitor location, and the aggregation computer is coupled between the central computer and the exhibitor computer. The first communication channel is configured to facilitate the electronic transfer of the digital version of the motion picture from the central computer to the aggregation computer. The second communication channel is coupled between the aggregation computer and the exhibitor computer, and configured to facilitate the electronic transfer of the digital version of the motion picture from the aggregation computer to the exhibitor computer. The back channel is coupled between the central computer and the exhibitor computer, which is configured to allow for the transfer of information between the exhibitor computer and the central computer.

In other, more detailed features of the invention, the first communication channel is a network or a satellite communication channel. Also, the second communication channel can be a wide area network. In addition, the digital version of the motion picture remains encrypted until the exhibitor computer is authorized to decrypt the digital version of the motion picture, normally, just for display or test purposes.

An exemplary method according to the invention is a method for distributing a motion picture. The method includes the following steps: providing a central computer located at a central site, the central computer configured to distribute a digital version of the motion picture; providing an exhibitor computer located at an exhibitor location, which is remote from the central site, the exhibitor computer configured both to receive the digital version of the motion picture from the central computer, and to display the motion picture; providing a communication channel configured to facilitate the electronic transfer of the digital version of the motion picture from the central computer to the exhibitor computer; providing a back channel, which is coupled between the central computer and the exhibitor computer, and configured to allow for the transfer of information between the exhibitor computer and the central computer; receiving the motion picture at the central computer from an external source; compressing, encoding, and encrypting the motion picture into the digital version of the motion picture using the central computer; transmitting the digital version of the motion picture from the central computer to the exhibitor computer through the communication channel; and transmitting information between the exhibitor computer and the central computer via the back channel.

Other features of the invention should become apparent from the following description of the preferred embodiments taken in conjunction with the accompanying drawings, which illustrate, by way of example, the principles of the invention.

DETAILED DESCRIPTION OF THE PREFERRED EMBODIMENTS

Digital cinema brings with it the promise of transforming the traditional methods of distributing filmed entertainment that have been utilized for decades. By most accounts, film distribution, in analog form, has improved tremendously over the years. Release printing processes have shown great technological improvements. Improvements in film stock, high speed printing, chemical processing and consistency, and printing element preparation and cleaning are just some of the significant improvements made to expedite the processing of film prior to its distribution.

Along with those innovations, land and air transportation likewise have seen significant improvements during the last several decades. These improvements have benefited the film industry by providing faster delivery of release prints on a worldwide basis to theatres. What use to take weeks now takes days. These improvements have provided a foundation to support revised theatrical release strategies and to support worldwide "day & date" methodologies (The term "day & date" is the entertainment industry reference to releasing a feature on the same day in foreign territories as the North American release date, which typically is the first release date. Logistics challenges have always been associated with implementing a "day & date" strategy due to local territory needs.). As a result of these improvements, release prints can be dubbed, subtitled, and distributed to multiple countries worldwide on an expedited basis.

With all of this being said, the improvements over the last several decades, while making processes faster, never materially changed the inherent workflows and distribution practices of previous times. With the advent of digital cinema, concepts dealing with the distribution of feature films to theatres introduced a profound paradigm shift in filmed entertainment.

The use of both unicast and multicast systems, which have been used for decades, via satellite, terrestrial broadband, or a combination of both for television product, provide an ideal platform for digital cinema distribution. Many of the processes surrounding distribution scheduling, conditional access to receivers, file management, both from central site and at the client site (in this case, at each individual exhibitor location), and back-channel reporting, are applicable to digital cinema delivery requirements.

This document describes and discusses the attributes and challenges associated with digital cinema distribution. The major components of digital cinema distribution include: content preparation (both from film-based elements and digital elements), the transport mechanism from the distribution center to the exhibitor, the security protocols implemented on several levels both at the asset level and at the transport level, the exhibitor-side receiver and reporting components, asset management, and archival systems.

Unlike the development of core display technologies that provided the basis for digital cinema to become a reality, distribution of file-based content today is used extensively for a variety of business applications and outlets. Also, the growth of broadband access and the expanded use of the Internet provides resources to support digital cinema distribution. The development of compression technologies, currently used for other distribution outlets, further support the distribution of large files. This document will frequently draw parallels to pre-existing processes and systems used predominantly within the television industry in order to provide the reader with additional references and insight into the use of the technologies discussed herein.

Content preparation typically begins via one of two methods: by compressing and encoding the feature film using the interpositive as the master source, or by compressing and encoding via the use of a digital intermediate master source file. In either case, the compression and encoding protocols are coupled to the related server and display system(s) intended to be used within the exhibitor's location. While significant work has been done with regard to standards setting, namely through entities such as The Society of Motion Picture and Television Engineers ("SMPTE") and the International Organization for Standardization ("ISO"), content providers must still encode the content to specific server/display systems.

The most significant challenges with respect to content preparation reside within the compression and colorimetry components of feature preparation. As the creative community increases its use of the digital intermediate process, the use of interpositives as the reference for digital cinema version creation will not necessarily be appropriate. The digital cinema paradigm redefines quality based upon continuing improvements in resolution capture and display capabilities. Also, tools most commonly available within the video domain that can be used to manipulate the look and feel of the feature are replacing those processes that have been purely photo-chemically based.

Transport mechanisms can take several forms and can be combined to successfully provide customized last-mile connectivity while not compromising the capabilities of long-haul, high-bandwidth carrier options. Since digital cinema can take advantage of "just-in-time" delivery options, data rates and bandwidth allocations can also be customized to optimize network configurations. Where days were required to deliver film release prints in physical form, digital delivery now can be customized according to the urgency of delivery. Using Internet protocol ("IP") over Moving Picture Experts Group ("MPEG") or digital video broadcast ("DVB") transport mechanisms, the file can be segmented and distributed on a packet-by-packet basis in streaming or broadcast form, or opportunistically. The use of opportunistic data available within a transport stream provides exciting options for digital delivery.

One can argue that due to digital cinema file sizes (typically >40 GBytes), certain challenges regarding packet delivery consistency and error correction can be reasonably managed especially using current store and forward technologies.

The use of terrestrial, secure, dedicated fiber, virtual, private networks, broadband cable, or asymmetric digital subscriber line ("ADSL") capacity can be tailored to suit delivery and budget constraints. In most cases, and even in large markets, it would be acceptable for delivery of a feature film to take several hours (for example, overnight) to be successfully delivered and confirmed back to the hosting server from the distribution center. Again, the new paradigm will measure delivery within hours and ultimately minutes instead of days, as has been the case.

Above all, distribution of digital cinema files brings with it opportunities to implement two components of content protection and piracy countermeasures: the migration to "just in time" delivery, and the introduction of advanced security protocols intended to protect the file from piracy during the distribution process.

Delivery of feature films just prior to their scheduled exhibition time provides embedded security improvements just by virtue of the elimination of the entire traditional physical distribution process in which release prints typically pass from printing labs, to distribution depots, to shipping entities, and then to exhibitors. Due to dependencies on traditional shipping methods, which remain dependent upon such factors as weather and transportation organizations, the current process of getting feature films to theatres on time is less of a science and more of a conservative planning exercise.

In the area of security and security protocols, the options made available by virtue of distributing files versus release prints are significant. There continues to be an ongoing yet interesting debate as to whether or not digital cinema brings with it options for better, more robust security. After all, one could argue that one print shipped in the traditionally manner has significantly less global exposure than the distribution of a feature in file format over potentially public networks. This view tends to be based in part on the comfort associated with traditional distribution methods and less so on technological evaluation.

Security is a multi-layer, multi-dimensional activity dealing with storage, transport, and content security. The state in which content resides on a local server can be considered one component whose keys are managed discreetly from other types of authentication needed for that transport.

Whether via satellite or terrestrial, some form of conditional access can be applied to provide basic addressing from source to destination. Additionally, encryption applied to data packets protecting both essence, which is visual and aural content, and metadata associated with the content is used. Encrypted packets whose keys are managed discreetly, are then distributed via a protected transport stream providing dual content protection. Options for applying multiple layers of security, along with key management, are discussed in greater detail within this document, as well as the use of watermarking and forensics tracking.

Once received at the exhibitor location, content packages that include a metadata package and the content typically are stored locally within the exhibitor display system, which is the storage and display system installed at the exhibitor location. The metadata package contains a predefined and encoded data set of key attributes associated with the content package. These attributes can be passive descriptors or active enablers that trigger functionality within the exhibitor display system. As part of the metadata package, instructions, e.g., release window instructions and authorized play period instructions, are also included to provide media management at discreet locations for multiple files. Deletion procedures can be automatically scheduled within the exhibitor display system, or performed remotely via the host distribution system and scheduling application.

Back-channel reporting plays a key role in file management between the host and the client. Back-channel reporting can be established via a variety of methods, but most commonly is established via the Internet. The back channel provides messaging back to the host that includes file delivery confirmation, file format integrity, and information regarding file movement from the caching server to the play-out system. In some cases, this could be accomplished by a singular system, but as multiple content sources are delivered (the challenges of which will be described later) at different times and speeds, some form of cataloging and off-loading from the caching server to the exhibitor display system(s) is prudent. This helps to maintain discreet transmission and display environments, and reduce errors associated with data corruption issues, problems that may occur with the distribution link that can affect the display system, and storage contention issues within the caching server.

Digital Asset Management ("DAM") is another key component of digital cinema distribution. Massive files along with numerous pieces of interstitial material and data quickly become unruly and difficult to catalog and track. While digital distribution has developed at a relatively rapid rate, applications suited for file management from a scheduling, distribution, and archival perspective are limited in availability and limited in the functionality needed to support digital cinema once fully deployed.

Of importance is the establishment of metadata standards. A significant amount of work already has taken place regarding metadata standards. For example, SMPTE already has preliminarily defined metadata for the purposes of defining the image itself from display system to display system. Elementary metadata that identifies the values necessary to support interchange are mapped and must be carried between systems to successfully display the original file.

While ongoing discussions remain, the inclusion of metadata fields that can be populated by, and link to, exhibitor box office data is possible. By virtue of creating both a digital distribution link and required back channel for file management and reporting, it also provides a pathway back from the exhibitor to the distributor. This link can provide real-time data ranging from, but not limited to, exhibition date, exhibition time, exhibition complex, screening room, and box office receipts associated with exhibition times. Also, additional data can include confirmation of specific activities like date/time stamp of the actual playing of the file (feature), and discrepancies associated with the digital display system. System monitoring of the display's current state is available and can be captured as data reported back to a distribution central site via the reporting back channel.

Lastly, the archives of the digital masters must be considered. As with digital asset management, much work remains to effectively manage digital cinema masters. Several factors have to be considered including the native resolution of the original source material and its form. An uncompressed feature film of roughly two hours in length requires approximately 8 terabyte. In compressed form for display, that drops down to anywhere between 50 GB and 350 GB. These numbers will continue to change as compression algorithms continue to improve.

Figure 1:
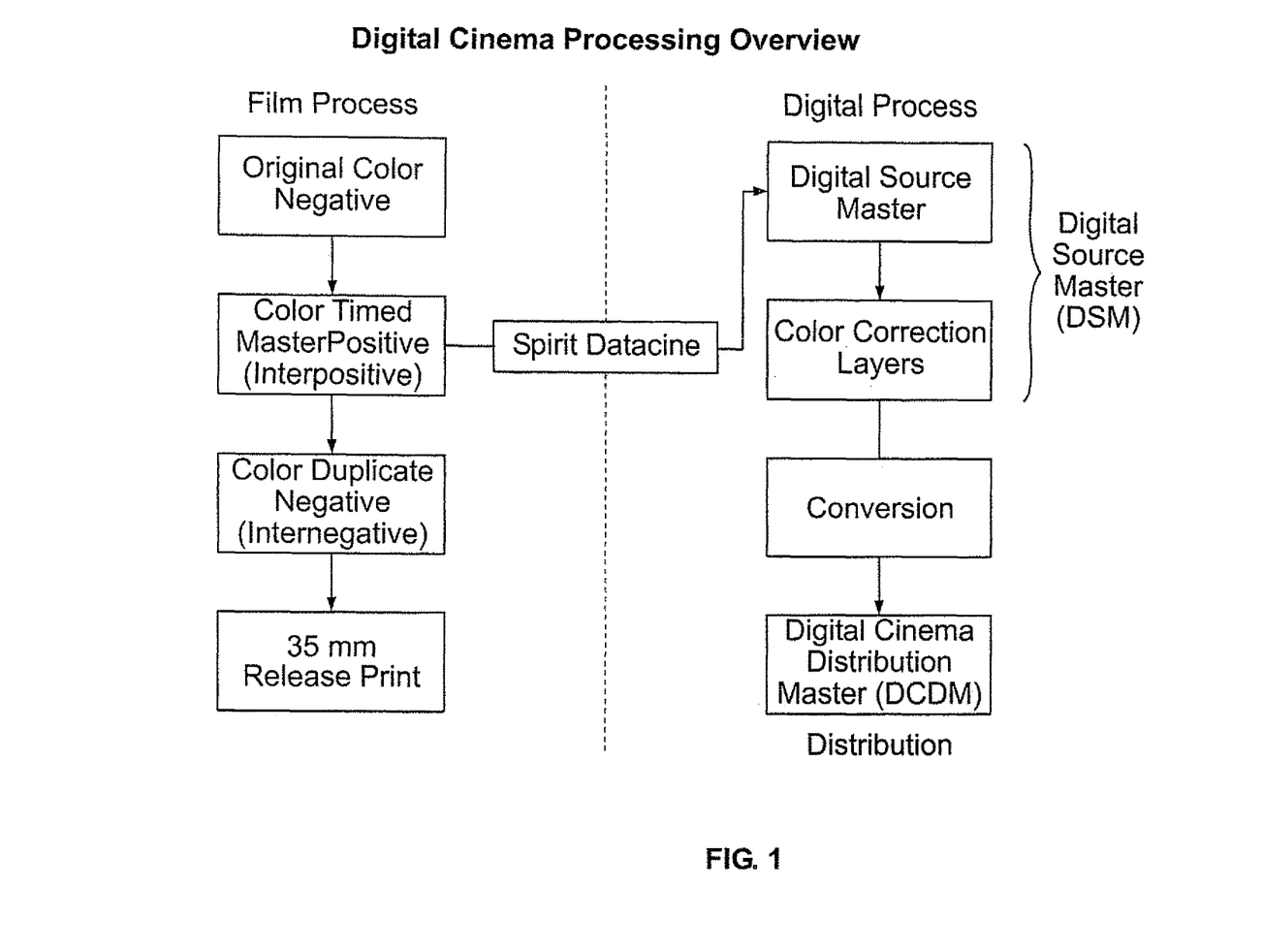
FIG. 1 is a block diagram depicting an overview of digital cinema processing steps.

Depending upon the original production elements, e.g., 35 mm film and their intermediate elements, e.g., chemically processed answer and check prints versus digital intermediates, the archival methodology will change. The retention of the digital cinema distribution master ("DCDM"), which is defined by SMPTE DC28, for use to support creation of subsequent distribution outlet master creation should be considered. The conversion process from the original color negative to the DCDM is shown in the block diagram of FIG. 1. For example, the DCDM can be used to generate high definition and standard definition versions to support Home Video and Television outlets.

System Overview

A. Distribution Options

Figure 2:
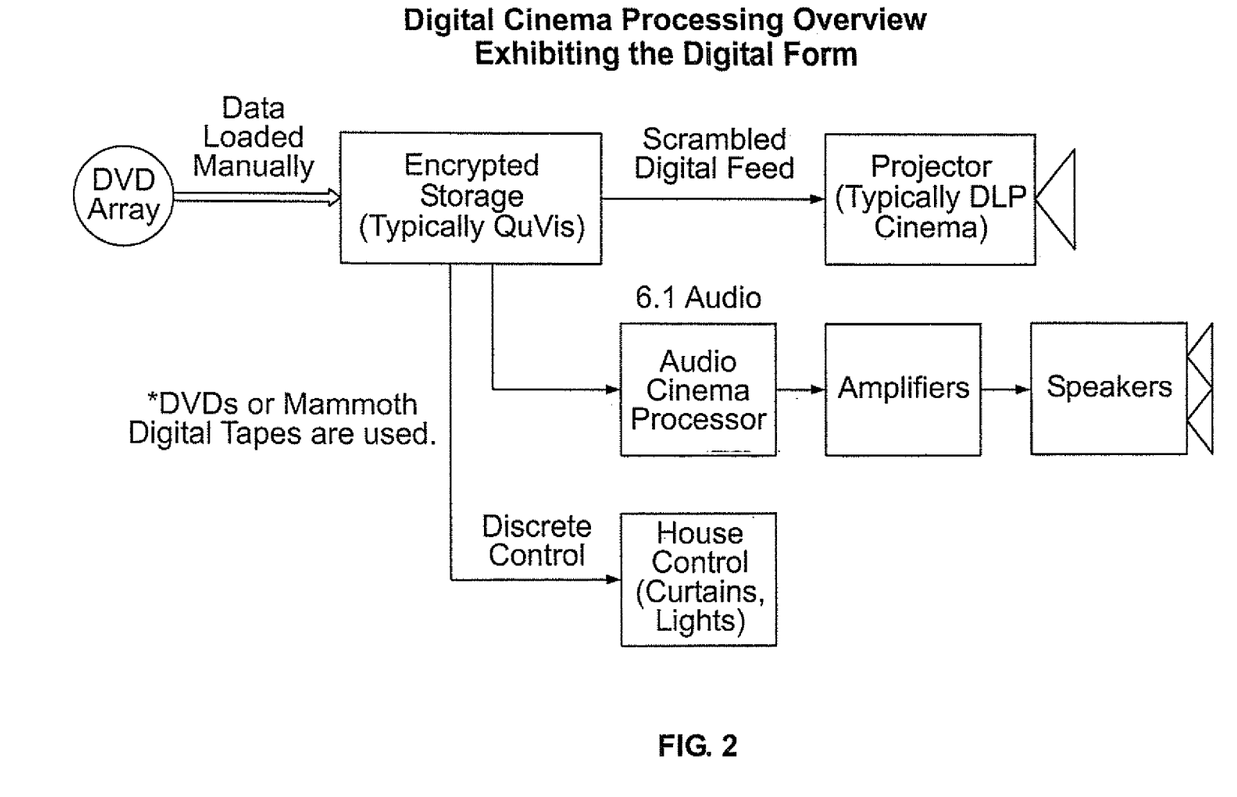
FIG. 2 is a block diagram depicting components included in a digital cinema display system and the flow of data between the components.

While this document is intended to focus on digital distribution using Internet protocol over a variety of transports, it is important to briefly discuss two common methods still used to distribute digital cinema. Currently, digital video disc ("DVD") (whether replicated/stamped or DVD-recordable ("DVD-R")) and digital tape are used most widely to distribute features to exhibitors. The digital cinema distribution master ("DCDM") is used as the source to create multiple copies of the feature. Local ingest, as shown in the block diagram of FIG. 2, is still required to upload the feature onto the display's server system.

In short, distribution of digital cinema feature files can be accomplished via three primary methods: through the use of optical media (typically DVD), digital storage media (tape or hard disk drive ("HDD") technology), and digital distribution (both via satellite or terrestrial).

Using optical media or digital storage media still requires physical distribution to be used as the mechanism to transport the feature from the distributor to the exhibitor. The economic benefits associated with streamlining transport are limited to reduced fees associated with smaller assets to be shipped versus those associated with shipping roughly 45 pounds of film per print to each exhibitor. A typical feature requires 10 to 15 DVDs, while only one high-density digital tape or disc drive typically is required to store the feature.

There are additional, incremental savings associated with shipping on a rush basis DVDs or tape versus a film print. Again, this savings is primarily based on the payload differences in the media used. These methods are still dependent upon transport agents and carriers to move the feature from point to point.

Digital distribution is widely viewed as the logical platform of the future to support digital cinema from a mass market perspective. There are a number of options currently available and more are anticipated as bandwidth access, compression improvements, and intelligent switching networks make moving large files more reliable. Likewise, the option of streaming a feature over terrestrial public networks continues to be developed and has been tested across the Internet2, namely the next generation high-speed network, as discussed in *SHD Digital Cinema Distribution over a Global High-speed Network: Internet2*, Yamaguchi, Shirai, Fujii, Fujii: NTT Network Innovation Laboratories, August 2003. This option provides the capability to move large, high-resolution files direct to display systems within the exhibitor location. The challenges associated with this model include reliability across the network to ensure minimal packet loss and re-transmission needs as well as adaptive buffering systems, which would manage data transmission fluctuations that would interrupt playback. In most cases, the use of store and forward systems is possible for non-broadcast, non-real time, exhibitor requirements.

Store and Forward methodology coupled with the use of new transmission optimization tools that improve the Quality of Service ("QoS") of IP-based networks can be used very effectively to distribute digital cinema files. Since packet losses as low as <10% can interrupt streaming delivery, transmission tools that compensate for packet loss and latency issues associated with the buffering of data are important. Within the use of store and forward systems, these tools coupled with enhanced Forward Error Correction ("FEC") and the ability to send the digital cinema file in a non-broadcast fashion provide acceptable reliability for network transmission schemes and allow for the use of opportunistic data transmission models to be leveraged at compelling, cost-effective rates.

In either case (via streaming or store and forward methodology), the issue of last-mile connectivity is affected by exhibitor location and broadband access. The use of satellite or terrestrial delivery coupled with last-mile options, business rationale, and cost considerations will drive architectural decisions for delivery on an individual basis. For example, rural locations may be suited for satellite delivery via the use of a low-cost, Receive Only ("RO") system mounted on the exhibitor's premises. In more urban areas, where satellite reception is limited as well as dish installation options, the use of commercial, long-haul fiber networks coupled with last-mile broadband providers may be more appropriate. In all cases, network and content security is crucial and will be discussed in more detail later.

B. System Components

The basic system architecture needed to support digital cinema distribution can be described in the context of satellite delivery requirements versus terrestrial network delivery requirements. Subsets of these architectures can be combined where a satellite is used for the long-haul portion of the delivery to a central aggregation site and a wide area network ("WAN")-type of approach is used for depot-type delivery from last-mile broadband providers into exhibitor locations.

The transmission schemes present a high-level view of typical architectures that support digital cinema distribution. It is assumed that standard transmission protocols are maintained, whether they are MPEG-based transports that are DVB-compliant, or Internet protocol-based ("IP-based") transports that utilize some form of transmission control protocol/Internet protocol ("TCP/IP") or user datagram protocol/Internet protocol ("UDP/IP").

Enhancement tools are not standardized for networks and continue to improve leaving selection up to the distributor or manager of the network.

The transport platform is completely independent of the display system codecs used. This means that different compression schemes can be successfully utilized for the feature itself. Subsequently, the compressed DCDM can be wrapped utilizing another compression scheme via the transport. A good example is the use of wavelet-based compression algorithms for digital cinema file creation while MPEG transports are used as the carrier compression scheme on which the file rides.

C. File Attributes

The best way to describe a digital cinema file is roughly similar to that of a video-on-demand ("VOD") file with the content resident as well as descriptions about the content and instruction sets that enable specific functions within the VOD environment. Within a digital cinema package there is the asset itself which includes visual and aural content. This intentionally is kept broad because the content associated with additional functionally, e.g., interactivity, is still at root, visual and aural content. Also, a metadata file containing several attributes about the file is included and described below.

The content package as defined by SMPTE (see SMPTE Draft DC28.101-2883B Rev. 7.4 2004-1-29, although still in draft form as of this writing) includes the image structure supporting various resolutions, along with color encoding, and white and brightness reference coordinates, which are unique to different display systems. These references support 1.3, 2.0, and 8.0 mega-pixel at 24 frames-per-second resolution systems.

Additionally, file formats supporting interstitial elements such as subtitle streams are included. Audio files are maintained discretely from visual files. The entire image structure is intended to provide a standard for the DCDM package that would be transportable between unique systems.

Included in the package is a metadata set for defining both passive and active attributes of the file. In metadata terms, the composition or self-contained digital cinema asset includes various descriptors about the asset(s) themselves. Extensible Markup Language-based ("XML-based"), asset descriptors include, but are not limited to, feature title, trailer information, ratings, feature version, e.g., English or French, first and last frame information (ironically equivalent to start-of-message and end-of-message information popular in the video domain), and playlist information that directs file activation on a timed, sequential basis. Known within the SMPTE draft (see SMPTE DC28 Application Specification for Digital Cinema Packaging ("AS-DCP")—Proposed SMPTE 000X 2004-02-11) as "reel structure", it enables file management and playlist sequencing.

D. Digital Distribution Functional Areas

The use of satellite and terrestrial broadband technology has already been previously described. This section will talk more specifically about the core systems needed to support digital distribution regardless of the transport selected.

1. Central Site

Figure 3A:
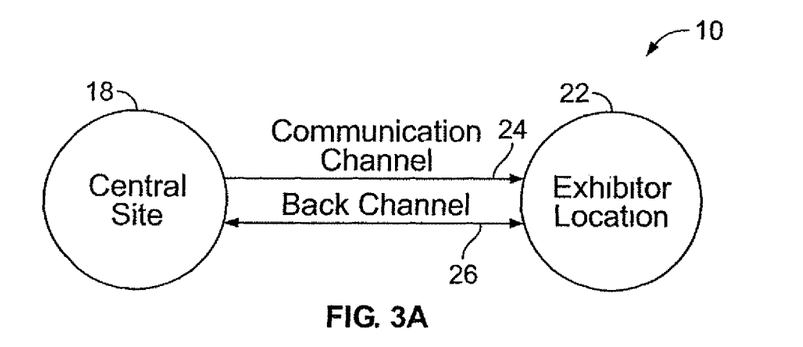
FIG. 3A is a block diagram depicting a motion picture distribution system, which includes a central site, an exhibitor location, a communication channel, which is coupled between the central site and the exhibitor location, and a back channel, also coupled between the central site and the exhibitor location, according to a preferred embodiment.
Figure 3B:
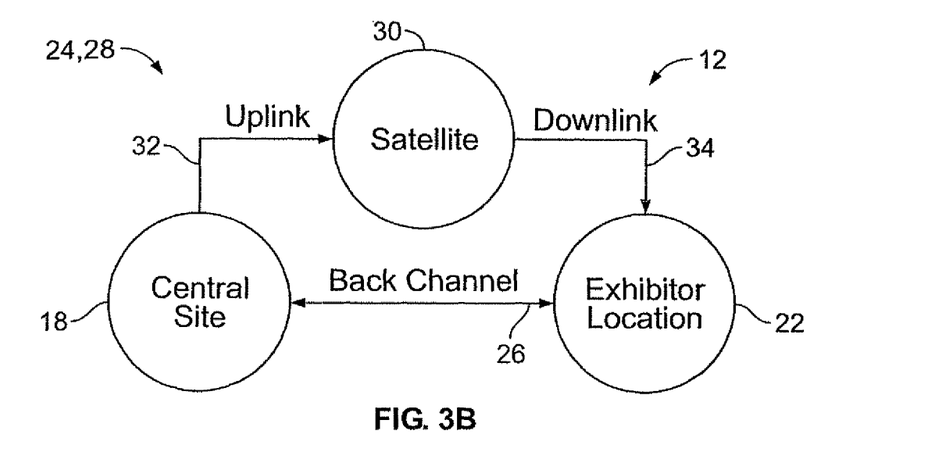
FIG. 3B is a block diagram depicting a motion picture distribution system, which includes a central site, an exhibitor location, a satellite communication channel (including an uplink channel and a downlink channel), which is coupled between the central site and the exhibitor location, and a back channel, also coupled between the central site and the exhibitor location, according to another preferred embodiment.
Figure 3C:
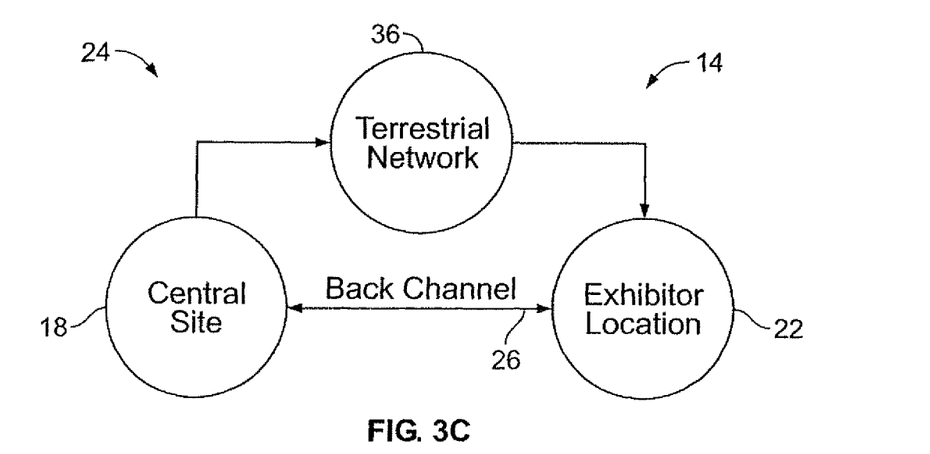
FIG. 3C is a block diagram depicting a motion picture distribution system, which includes a central site, an exhibitor location, a terrestrial network to which the central site and the exhibitor location are coupled, and a back channel, which is coupled between the central site and the exhibitor location, according to another preferred embodiment.
Figure 3D:
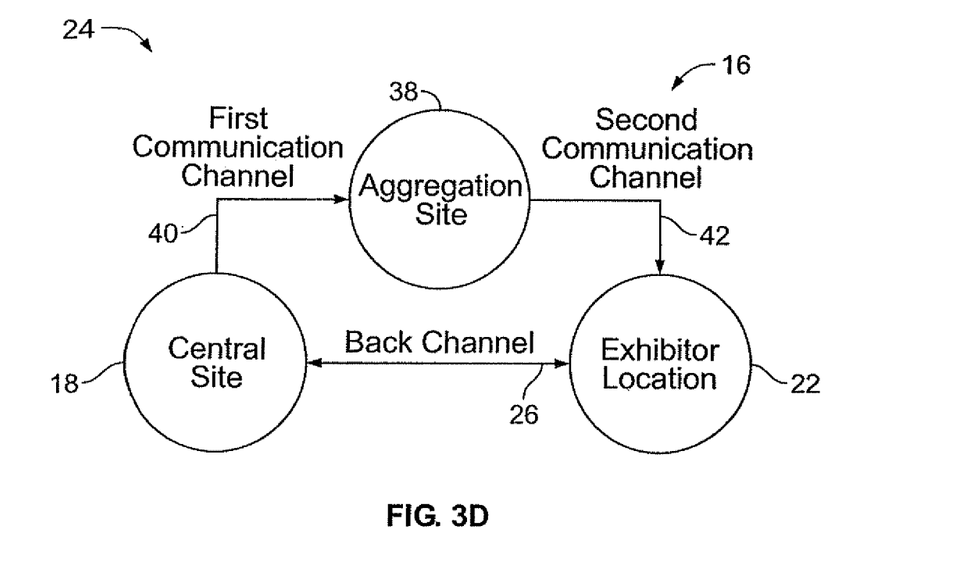
FIG. 3D is a block diagram depicting a motion picture distribution system, which includes a central site, an aggregation site, an exhibitor location, a first communication channel, which is coupled between the central site and the aggregation site, a second communication channel, which is coupled between the aggregation site and the exhibitor location, and a back channel, which is coupled between the central site and the exhibitor location according to another preferred embodiment.
Figure 3E:
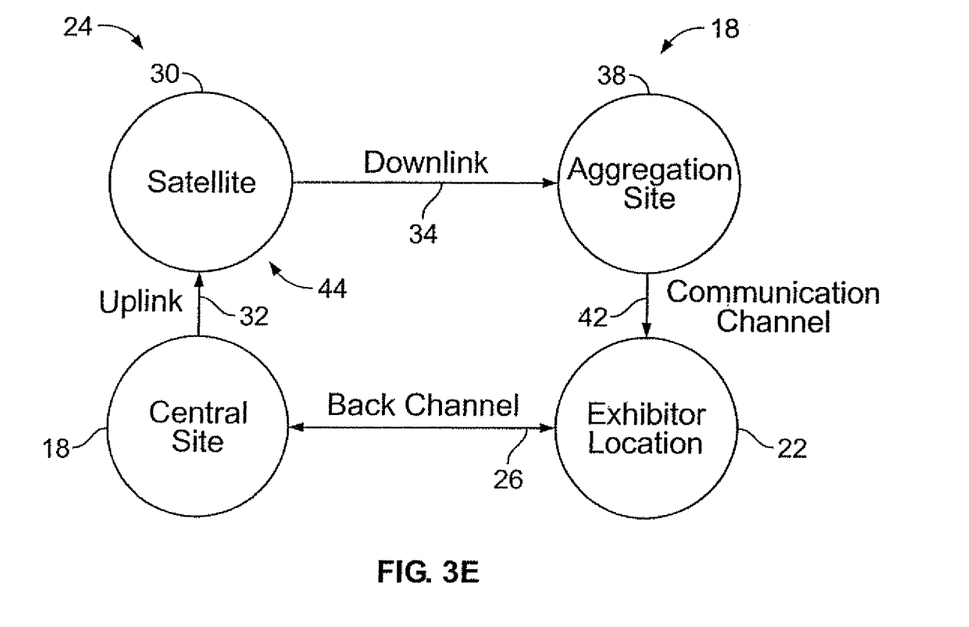
FIG. 3E is a block diagram depicting a motion picture distribution system, which includes a central site, an aggregation site, a satellite communication channel (including an uplink channel and a downlink channel), which is coupled between the central site and the aggregation site, an exhibitor location, a communication channel, which is coupled between the aggregation site and the exhibitor location, and a back channel, which is coupled between the central site and the exhibitor location according to another preferred embodiment.
Figure 4:
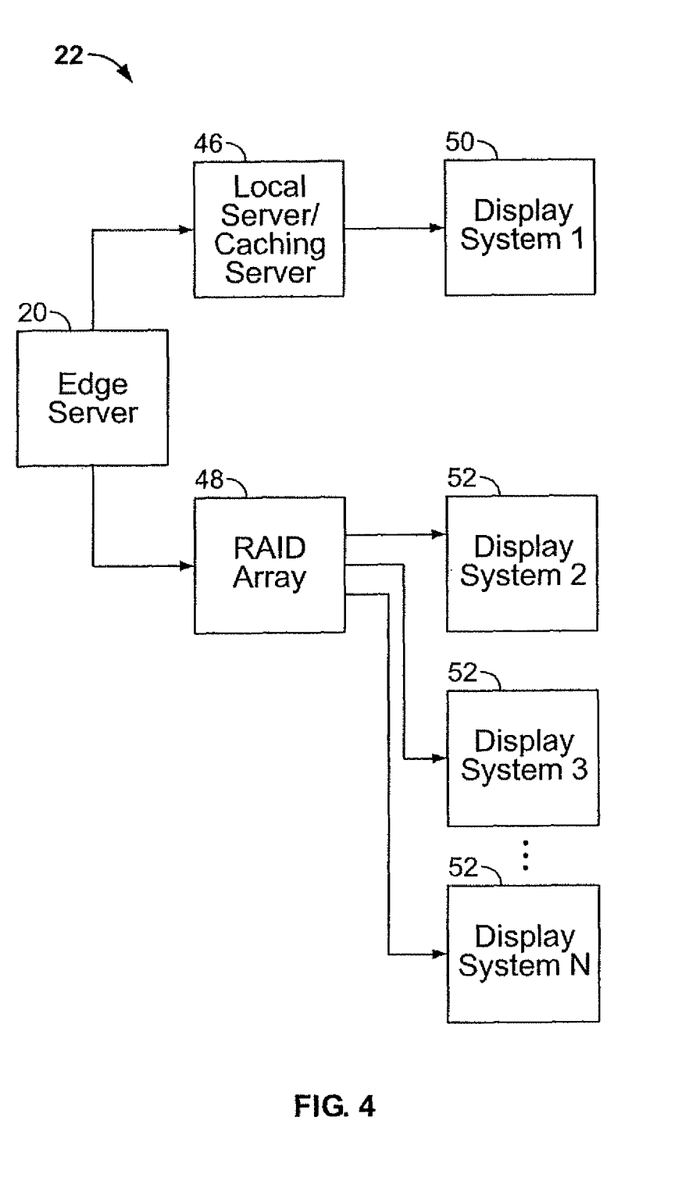
FIG. 4 is a block diagram depicting exhibitor location components, in particular, an edge server, a local server, a RAID array, and display systems, according to a preferred embodiment.

Referring to the block diagram of FIGS. 3A-E, which depict motion picture distribution systems 10-18, respectively, and FIG. 4, the central site 18 can be defined as the distribution hub, network operations center, or master control, which help to describe its function relative to existing distribution models. While mastering functions can be included as part of the central site's responsibility, typically its role is to aggregate, schedule, distribute, archive, and report on file distribution across a distributed network. Whether through the use of multicast scheduling or point-to-point delivery, the central site, via a computer, "pitches" content, which the central site receives from another source, to edge servers 20, other computers, located remotely at exhibitor locations 22.

The block diagrams of FIGS. 3A-E depict different embodiments of the present invention, all of which include a central site 18, an exhibitor location 22, a communication channel 24, and a back channel 26, which is coupled between the central site and the exhibitor location. In particular, FIGS. 3A-3C depict embodiments where the central site is coupled to the exhibitor location using the communication channel. In the embodiment of FIG. 3B, the communication channel is a satellite communication channel 28, which includes a satellite 30, an uplink channel 32, and a downlink channel 34. In the embodiment of FIG. 3C, the communication channel includes a terrestrial network 36.

The block diagrams of FIGS. 3D and 3E depict embodiments that include an aggregation site 38, which is coupled between the central site 18 and the exhibitor location 22 with a first communication channel 40, which is coupled between the central site and the aggregation site, and a second communication channel 42, which is coupled between the aggregation site and the exhibitor location. In the embodiment of FIG. 3E, the first communication channel is a satellite communication channel 44, which includes a satellite 30, an uplink channel 32, and a downlink channel 34.

The FIG. 4 block diagram depicts exhibitor location components, in particular, an edge server 20, which is coupled to both a local server 46, or caching server, and a RAID array 48. The local server also is coupled to a display system 50, and the RAID array is also coupled to a plurality of display systems 52. The edge server "catches" the content, and decodes and stores it locally for dissemination to a local server assigned to a specific display system or onto a RAID array that serves multiple streams to displays using a storage area network ("SAN") and routing technology, and eliminates the need for a 1:1 architecture. The words "pitch" and "catch" are terminology typically associated with video-on-demand systems, and refer to the store and forward method of delivery of a file from a source to a destination.

Back-channel reporting, via the back channel 26, to the central site 18 confirms file delivery and file integrity at the edge server 20. The central site provides distribution reporting, which includes network performance (re-transmission requirements), delivery completions, deliveries queued and awaiting delivery, delivery failures, and edge server status. One of the challenges with management of digital cinema distribution (as is the case with Video-on-Demand), is remote management of edge server storage. Caching contention issues should be assumed during the design phase and automated offline storage should be evaluated. This would include the ability of the central site management application to purge the caching server 46 of dated files not locally purged, and to move them offline so other files can be delivered. Absent such functionality, contention issues around delivery of files from multiple distributors is possible.

2. Edge Server (Exhibitor Location)

The client-side, or edge-server architecture for file reception is composed of the following components used to support satellite and terrestrial network reception. For satellite reception, an integrated receiver/decoder ("IRD") (not shown), included in the edge server 20, is used to receive the downlinked satellite signal and decode the MPEG stream. The decoded stream is likely to have two layers of content protection applied, which will be discussed later, as well as some form of conditional access used to authorize the decoding (but not decrypting) process between receiver and decoder. Akin to set-top-box authorization, conditional access is intended to restrict delivery of multicast feeds to selected receivers only. In this way, only those exhibitors intended to receive a specific feature are authorized to do so. For delivery to the edge server via terrestrial networks, transmission control protocol ("TCP") connection and high-speed switching appliances attached to the decoder are required.

Once received, the file remains in encrypted form until, via a public and private key methodology, the file is authorized for play-out via the display system 50 and 52. In cases where the exhibitor is using a local (staging) server 46 in each auditorium and transferring the file between edge server 20 and staging server, the file remains in encrypted form. From an architectural perspective, at no time should the file be in the clear. Decryption should only occur within the cinema display system.

With respect to redundancy, SAN technology coupled with redundant array of independent disks ("RAID") array features provide options in the area of storage and file redundancy. Although traditionally used for information technology-based ("IT-based") business applications, the use of RAID arrays 48 for redundancy in production and distribution-related applications has become common. They allow an environment to be protected via a one-for-many scenario versus the traditional 1:1, primary and backup, device-to-device methodology. Via networking, a standby system with mirrored content can be used to backup multiple systems.

3. Back-Channel Reporting

Back-channel reporting provides feedback to the central site 18 via an Internet or dial-up (phone) connection between the edge server 20 (running a file management application and linked to the central site scheduling application). Back-channel reporting confirms file receipt and integrity, and notifies the central site of storage contention issues and re-transmission requirements due to network failures.

Enhanced functionality can extend beyond the local reception environment and into the exhibitor scheduling and ticketing systems. While technically capable, this functionality is left more to business decisions and contractual agreements between distributors and exhibitors. For security purposes though, the back channel 26 provides valuable feedback confirming the presence of authorized devices and deletion of expired files.

4. Security

As discussed previously, security of digital cinema files through the distribution process and while locally stored at the exhibitor location 22 until play-out is important. In light of growing peer-to-peer illegal file sharing and piracy escalation worldwide, the availability of a pristine, digital copy available on the Internet and thus used as a master source for illegal packaged goods manufacturing, makes protecting the digital file paramount to rolling out digital cinema on a large scale.

Security is being approached on several fronts that include active measures for protecting the feature, as well as passive measures, which aid in identifying the feature at any point in time. From a distribution perspective, the file, once compressed, is encrypted using a form of a generally accepted, military-grade, encryption algorithm. As of this writing, advanced encryption standard ("AES") 128-bit encryption is generally accepted, but no firm standards have been established as encryption development continues. SMPTE (see SMPTE DC28 AS-DCP Track File Essence Encryption—Proposed SMPTE 000X 2004-03-01) has drafted a specification, which utilizes AES with encrypted KLV triplets for track files to be uniquely encrypted.

The transport path has additional encryption provided while a conditional access system is embedded within the delivery path to authenticate the client-side reception device in advance of the occurrence of any reception of content.

In essence, three layers of content protection are applied: of the content package itself and not decrypted until play-out, of the transport path itself and decrypted on reception, and via authentication of the reception device via conditional access, which confirms device identification.

EXAMPLE

The entire process for the successful multicast distribution of digital cinema content consists of three major phases: the first is the digital encoding of the film reels and the packaging and encryption of the asset next is the satellite transmission phase, and finally, the decryption, unpackaging, verification, and delivery of the digital asset to the play-out device 50 and 52. This process inserts IP data into the broadcast transport stream, multiplexed with one or more real-time audio/video content streams, or other protocol data encapsulated as MPEG content. The result is a single transport bit stream that contains each individual data stream multiplexed serially, and identifiable by a program identifier ("PID"), which determines each 188-byte packet as being part of a given content stream. A receiver/decoder is then programmed to recognize the PID of the particular content stream it is interested in decoding.

To accomplish these tasks, a rack was configured with a receiver personal computer ("PC") which consisted of a Broadlogic peripheral component interconnect-based ("PCI-based") DVB integrated receiver/decoder card, a digital subscriber line ("DSL") connection 24, a backup dial-up modem, and all of the Linux-based software necessary to run the system. The rack also contained a network-attached RAID array 48 for storing the media files, the QuVis QuBit ST digital video tape recorder ("VTR") play-out device 50 and 52, as well as audio digital-to-analog converters and an uninterruptible power supply ("UPS").

Phase 1: Asset Creation

The first phase involves the creation of the asset to be transmitted. The choices of bit rate and codec will depend on the target resolution and quality for projection (1 k, 2 k, 4 k), as well as the type of play-out device being used. Since a QuBit server was used for play-out, the files were compressed using the QuBit Media Format version 1 ("QMF1") at a maximum data rate ("MDR") of 30 megabytes per second ("MB/s") and a 51 dB signal-to-noise ratio ("SNR"). However, it should be noted that the transmission system developed is not dependent upon a particular play-out device 50 and 52 and can be made to work with anything capable of accepting an external bit stream.

Once the files have been encoded and/or compressed for the play-out device 50 and 52, they need to be encrypted. A 256-bit key length and block size variant of the Rijndael block cipher was chosen for this task. This algorithm (as of this writing) is recognized as extremely secure and difficult to attack by the Computer Security Division of the National Institute of Standards and Technology ("NIST"), and was chosen as the cipher of choice for Federal agencies to use when protecting sensitive unclassified information.

However, because it is desired to transmit this content to a number of different theatres at exhibitor locations 22 while being able to differentiate between them when distributing keys, a public-key cipher is necessary. For this the Diffie-Hellman key agreement protocol was chosen. This was done by creating a public/private key-pair for each receiver intended to go to a particular cinema. The public keys are stored at the uplink, and the private key placed on a medium that cannot be copied, such as a smartcard. Thus, the fixed Rijndael session key can be encrypted using the Diffie-Hellman method, once for each cinema downlink. In this way, the presence of the smartcard would be required for successful decryption. If the smartcard were to be found missing, the public key would be revoked at the uplink, and no further content would be decryptable by that card.

Once encrypted, the feature clip should be split-up into more manageable sections. Through testing, it was found that splitting the encoded media into 15 GB sections made for much more efficient memory utilization during the meta-content creation process. To split the files, Eugene Roshal's RAR Archiver software was used in uncompressed mode. RAR is a file format, which was created by Eugene Roshal and used for the compression and recovery of a variety of compressed data formats. The RAR file format is used for archiving purposes. The advantage of using the RAR Archiver was that 32-bit cyclic redundancy check ("CRC") values are calculated during the split operation which will allow for the confirmation of data integrity during reconstruction of the segments on the downlink side.

The other advantage associated with using the RAR Archiver is that split archives can be further scrambled with another password, which can be sent via the back channel 26 only to a particular network address. This provides some confirmation of the physical location of the receiver device (location verification will be discussed later).

Once the feature clip has been encrypted with the public keys of each cinema downlink, and then broken up in segments, they are ready for transmission.

Phase 2: Transmission

The transmission phase starts with scheduling the encrypted and segmented assets to be transmitted. As discussed previously, this involves generating a meta-content stream using a delivery optimization application, a variety of which are commercially available.

The algorithm allows an arbitrary-length input to be converted to an infinite stream of 1 kilobyte ("KB") meta-content packets. Each meta-content packet is a representation of the entire input data set. The complete construction of the output stream requires only the collection of a certain number of these packets, with no regard for which specific packets are collected. This means that the unpredictable nature of packet loss is negated. Each client will receive at its optimum rate regardless of its loss percentage. Clients with higher loss will simply take longer to collect the required amount of meta-content to construct the entire package. Even sites with loss approaching 100% would eventually receive a complete file (although transmission times would become prohibitively lengthy for excessive packet loss).

Traditional methods of error prediction and correction, such as Forward Error Correction ("FEC"), require one to predict the maximum correctable loss, and to be forced to incur the maximum penalty across all receivers, regardless of their individual loss to compensate for the total loss budget. Meta-content also negates the need for methods utilizing back channels 26 (Internet or dial-up) for any type of Automatic Repeat Request ("ARQ") method or error correction.

However, the back channel 26 is still utilized for the reporting of the transmission status, as well as a means to authenticate the location the receiver. Since the physical location of the downlink cannot be controlled to any greater extent than the footprint of a transponder or a spot-beam, a method to more accurately check the location of the receiver prior to starting decryption is desirable. This can be accomplished by examining the source IP address for Internet back channels, or the automatic number identification ("ANI") of the source phone for dial-up back channels (the latter being preferable due to its greater difficulty in being falsified.) This back channel can be used to deliver the first key needed to reassemble the segments, even before the smartcard is consulted for the DH key agreement phase and streaming decryption for output to the play-out device 50 and 52.

Once the segments have been received at the downlink, and the meta-content completely decoded, it is time to apply the decryption keys and prepare the asset for play-out.

Phase 3: Asset Re-Construction and Delivery to Play-Out Device

The final phase finishes the process of delivery by loading (via the back channel 26) the keys needed for building up the solid feature clip from the 15 GB segments. Since the RAR Archiver was used to split the encrypted feature-length clip into segments, it again is used to put them back together. During this phase, CRC values are checked, and a layer of scrambling is applied that can allow for a step in which the proper key is delivered to the receiver via the back channel only after certain requirements are met. For example, it can be used to enforce a start-time (by only delivering the key via the back channel immediately before the first permissible showing), as well as using IP addresses or telephone numbers to narrow down the physical location of the receiver.

The result is a file that can be streamed through a block-cipher decryption (in this case Rijndael 256) as its being delivered to the play-out device 50 and 52. This would likely need to be accelerated in hardware for high-bit rate codecs. However, since the QuBit did not support streaming the media from an external source for playback, it was necessary to load the entire feature clip onto the QuBit first. This method is considerably less desirable from a security standpoint since it allows an unencrypted version of the film to sit on a disc, but as the technology in play-out devices improves this deficiency in the current generation will be corrected.

The end result is a feature-length, digital film, delivered without error to any number of cinema downlinks regardless of transmission packet loss. Each exhibition location 22 is positively verified via the back channel 26 with playback permission granted through the use of a conditional access smartcard system.

Advantageously the present invention can include segregation of key management/distribution through a third party security provider or key management done via the central site. Both are viable options and operational decisions, not technological ones.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A method for distributing secure digital motion picture data for cinema use, comprising:

generating, by at least one computer, encrypted digital motion picture data from digital audio-video content by encrypting the digital motion picture data using a fixed key and encrypting the fixed key using a public key of a public/private key pair;

generating, by the at least one computer, multiple scrambled segments of encrypted digital motion picture data by segmenting the encrypted digital motion picture data into segments each comprising a compressed file containing a section of the encrypted digital motion picture and then scrambling each of the segments using a first key distinct from the fixed key and from the public key;

authenticating, by the at least one computer, a remote client by transmitting the first key via a first communication channel to a particular network address;

transmitting the multiple scrambled segments of encrypted digital motion picture data by the at least one computer to the remote client via a second communication channel distinct from the first communication channel, in response to successfully authenticating the remote client; and placing, by the at least one computer, a private key of the public/private key pair in a smartcard readable by the remote client.

2. The method of claim 1, further comprising converting the multiple scrambled segments of encrypted digital motion picture data to a stream of meta-content packets of an infinite-stream type and transmitting the multiple scrambled segments of encrypted digital motion picture data via the stream of meta-content packets to the remote client.

3. The method of claim 1, further comprising compressing the digital motion picture data prior to encryption thereof, yielding compressed digital motion picture data, using a wavelet-based compression algorithm.

4. The method of claim 3, wherein generating the encrypted digital motion picture data further comprises encrypting the compressed digital motion picture data.

5. The method of claim 1, wherein generating the encrypted digital motion picture data further comprises encrypting the digital motion picture data by a Rijndael block cipher that comprises the fixed key.

6. The method of claim 4, further comprising compressing the digital motion picture data again before transmitting the segmented motion picture data to the remote client.

7. The method of claim 1, further comprising controlling, by the remote client, file management and playlist sequencing of the digital audio-video content based on metadata of the digital motion picture data.

8. The method of claim 1, further comprising including metadata in the digital motion picture data, and controlling, by the remote client, allowable playback times for the digital audio-video content based on the metadata.

9. The method of claim 1, further comprising including metadata in the digital motion picture data, and controlling, by the remote client, deletion of the digital audio-video content based on the metadata.

10. The method of claim 1, further comprising including the fixed key attributes in the digital motion picture data.

11. The method of claim 1, further comprising transmitting the first key to the remote client at a time immediately before a first permissible showing of the digital audio-video content.

12. The method of claim 1, further comprising receiving distribution reporting from the remote client via the first communication channel.

13. The method of claim 1, wherein the first communication channel comprises a telephone line, and authenticating the remote client comprises using automatic number identification (ANI).

14. The method of claim 1, wherein authenticating the remote client comprises examining a source Internet Protocol (IP) address of the first communication channel.

15. The method of claim 1, wherein transmitting the multiple scrambled segments of encrypted digital motion picture data to the remote client comprises transmitting the multiple scrambled segments of encrypted digital motion picture data via a satellite communication channel.

16. The method of claim 1, wherein transmitting the multiple scrambled segments of encrypted digital motion picture data to the remote client comprises transmitting the multiple scrambled segments of encrypted digital motion picture data via a terrestrial network.

17. The method of claim 1, wherein transmitting the multiple scrambled segments of encrypted digital motion picture data to the remote client comprises transmitting the multiple scrambled segments of encrypted digital motion picture data via a satellite communication channel to an aggregation site for further transmittal via a terrestrial network to the remote client.

18. The method of claim 1, further comprising assembling of the multiple scrambled segments by the remote client using the first key, resulting in the encrypted digital motion picture data.

19. The method of claim 18, further comprising decrypting the fixed key by the remote client using the private key of the public/private key pair, and decrypting the encrypted digital motion picture data while streaming using the fixed key.

\* \* \* \* \*